(12) United States Patent
Chea, Jr. et al.

(10) Patent No.: US 6,937,157 B1
(45) Date of Patent: Aug. 30, 2005

(54) SMART CABLE FOR DESIGN OF HIGH DENSITY METALLIC CROSS CONNECT SYSTEMS

(75) Inventors: Ramon C. W. Chea, Jr., San Jose, CA (US); P. Kingston Duffie, Palo Alto, CA (US); Timothy John Hodgkinson, Santa Clara, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 397 days.

(21) Appl. No.: 10/146,682

(22) Filed: May 13, 2002

(51) Int. Cl.$^7$ ............................................. G08B 21/00
(52) U.S. Cl. ............................... 340/686.1; 340/568.2; 340/524; 361/827
(58) Field of Search .................... 340/686.1, 568.2, 340/568.4, 568.6, 524; 361/827, 679, 683, 361/724, 732, 737; 434/224; 439/65

(56) References Cited

U.S. PATENT DOCUMENTS

| | | | |
|---|---|---|---|
| 5,420,512 A | * | 5/1995 | Spillane et al. ............. 324/539 |
| 5,528,152 A | * | 6/1996 | Hinoshita et al. ............ 324/539 |
| 6,002,331 A | * | 12/1999 | Laor ........................ 340/539.1 |
| 6,163,464 A | * | 12/2000 | Ishibashi et al. ............. 361/788 |
| 6,608,762 B2 | * | 8/2003 | Patriche ...................... 361/788 |

* cited by examiner

*Primary Examiner*—Phung Nguyen
(74) *Attorney, Agent, or Firm*—Pillsbury Winthrop et

(57) ABSTRACT

The present invention to provide a "smart cable system" for high density metallic cross connect systems. In particular, this invention relates to the physical structure of cables and associated hardware needed to form the "smart cable system" for interconnecting cards in shelves and racks of high density metallic cross connect switching systems. This invention provides the cable installer the ability to connect cables to cards with minimal errors by using visual indicators. The visual indicators guide the cable installer such that he/she can properly install the cables into the appropriate connectors. The present invention also provides a means for detecting when and where the cables are connected within the cross connect system.

17 Claims, 6 Drawing Sheets

Smart Cable System Configuration

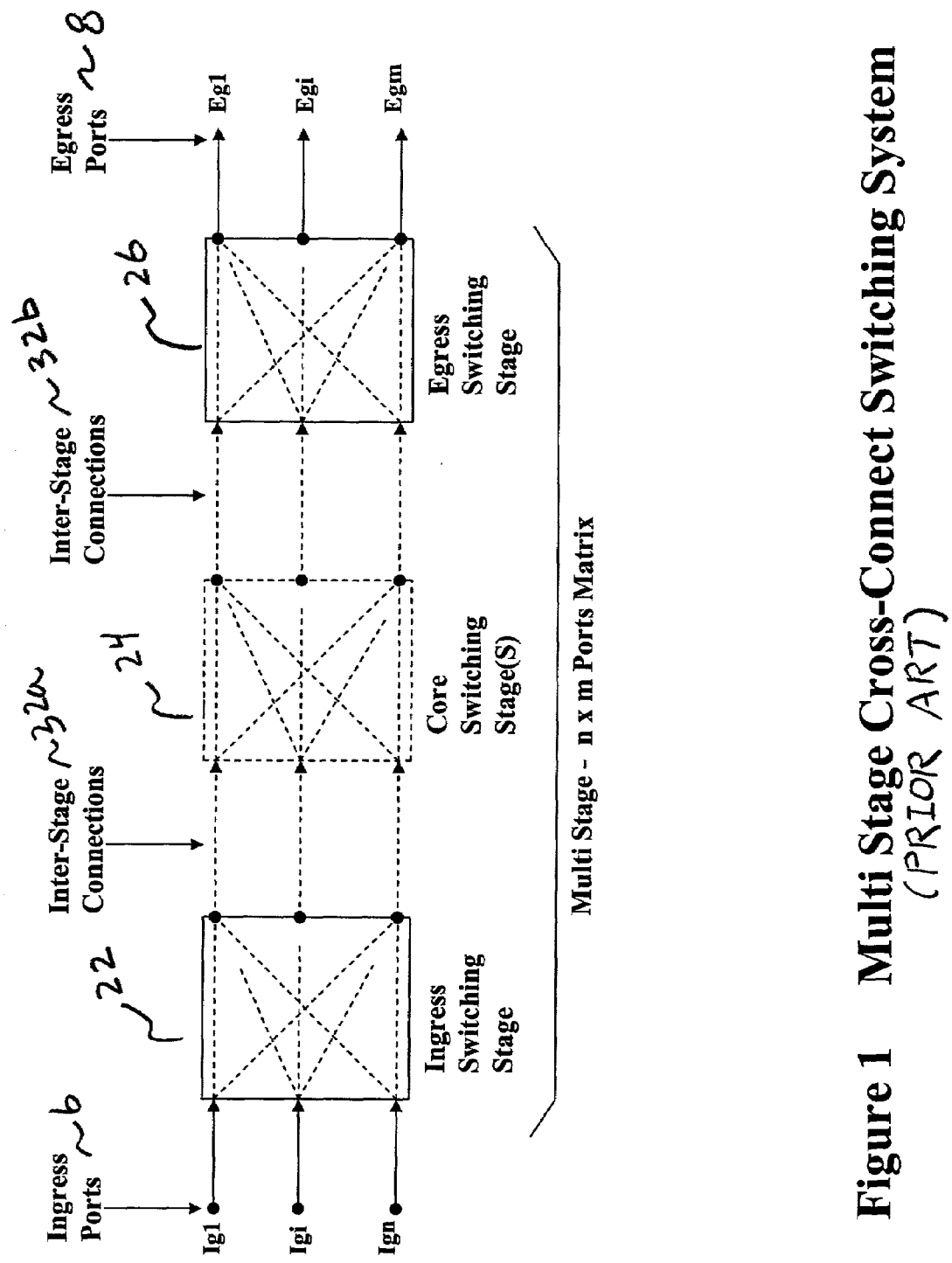
Figure 1   Multi Stage Cross-Connect Switching System
(PRIOR ART)

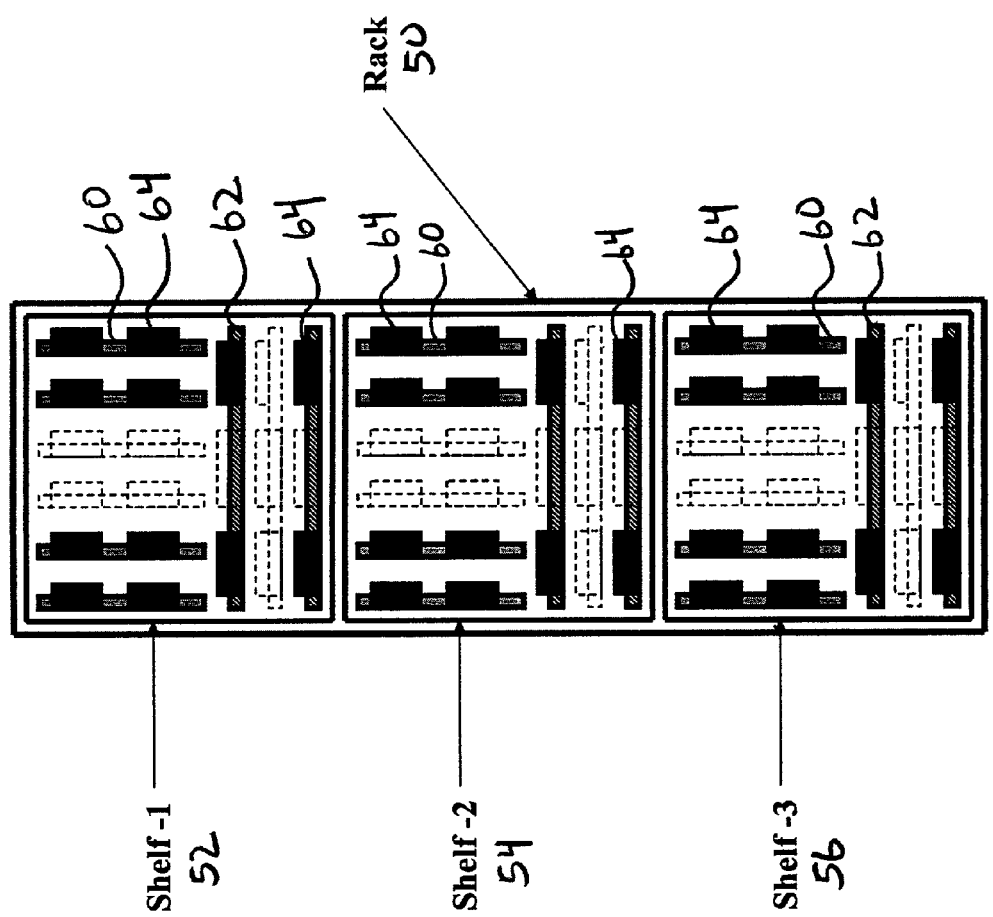
Figure 2  Rack – Rear View

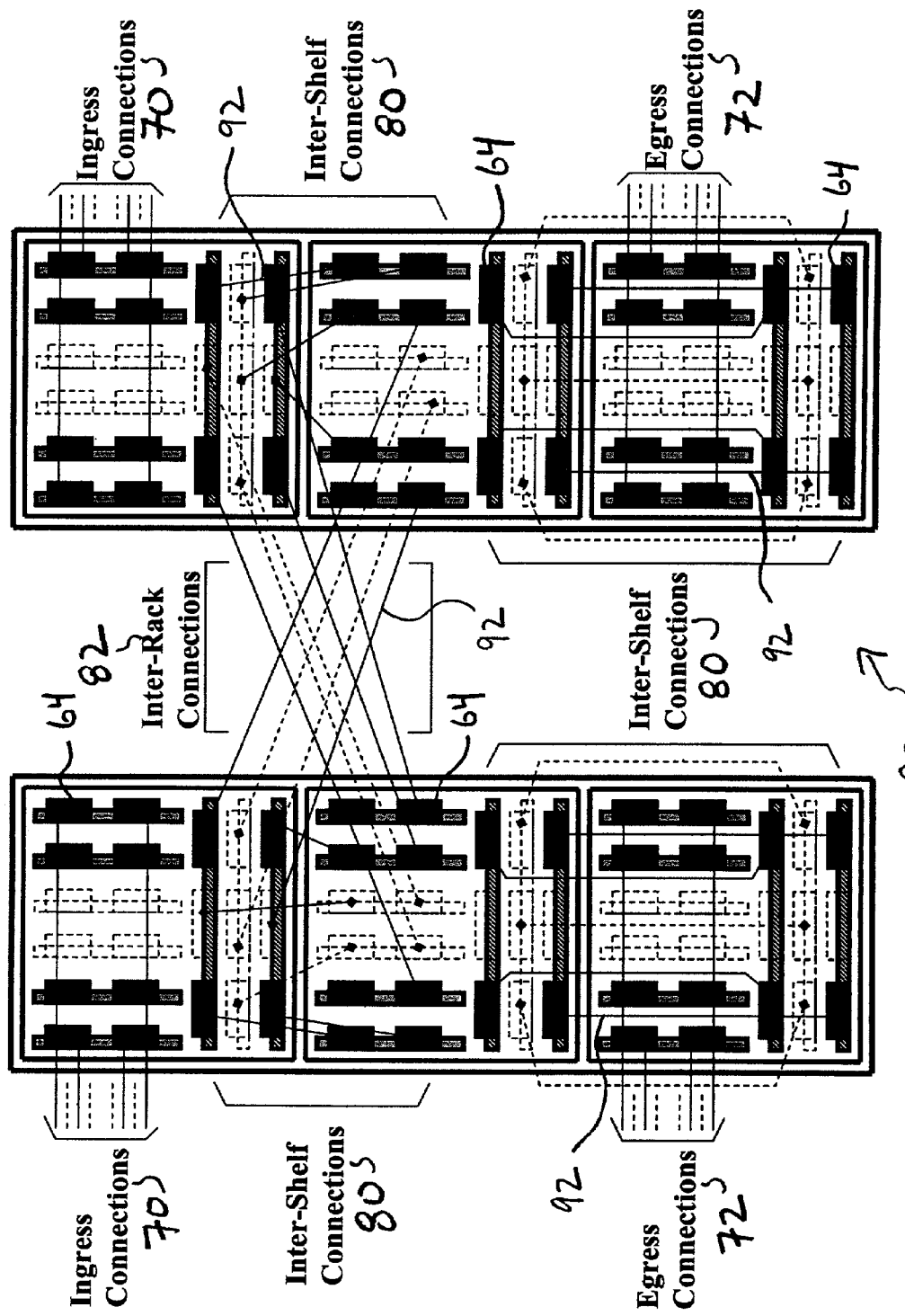
Figure 3  Inter-Shelf and Inter-Rack Cabling – Rear View

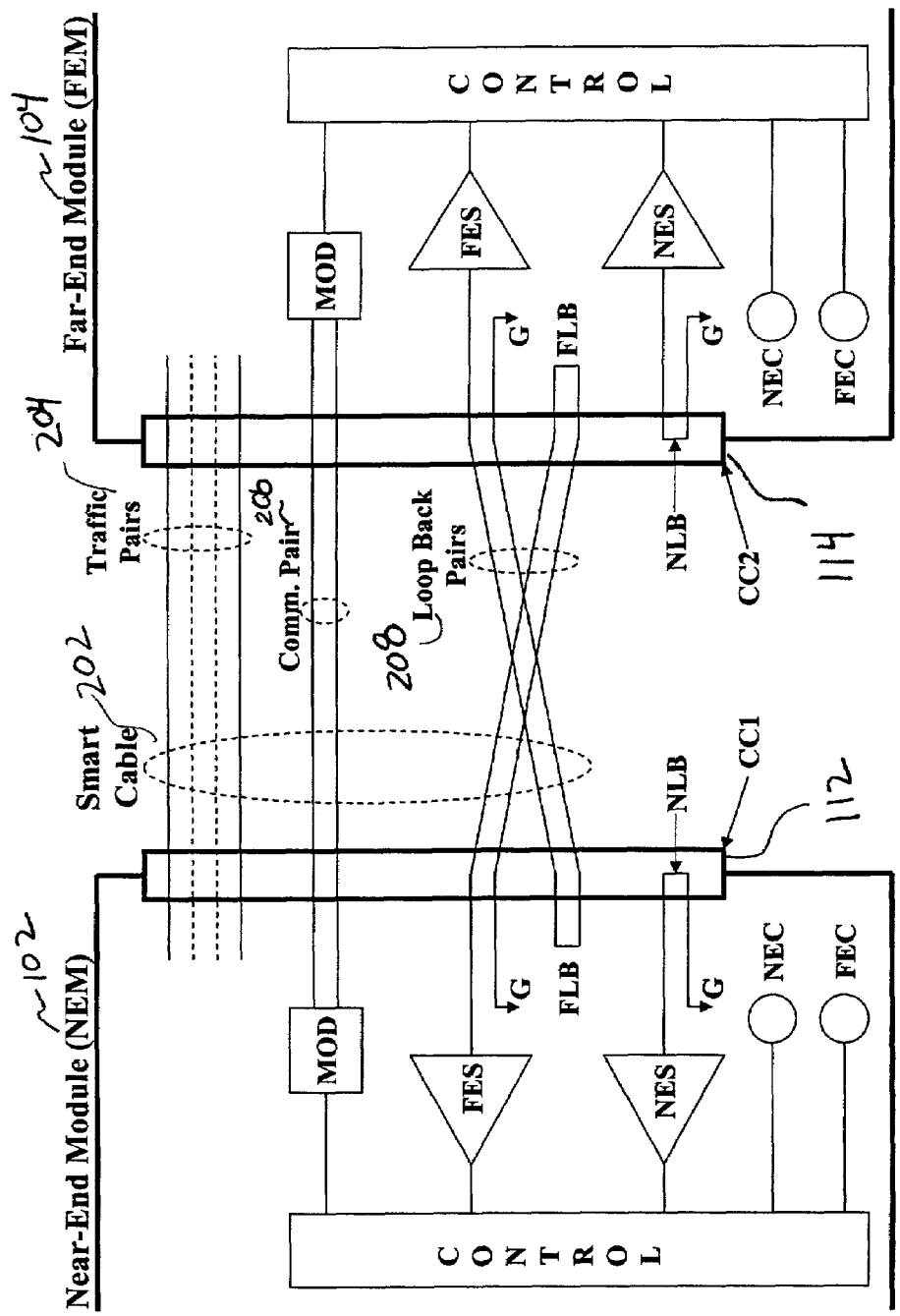
Figure 4 Smart Cable System Configuration

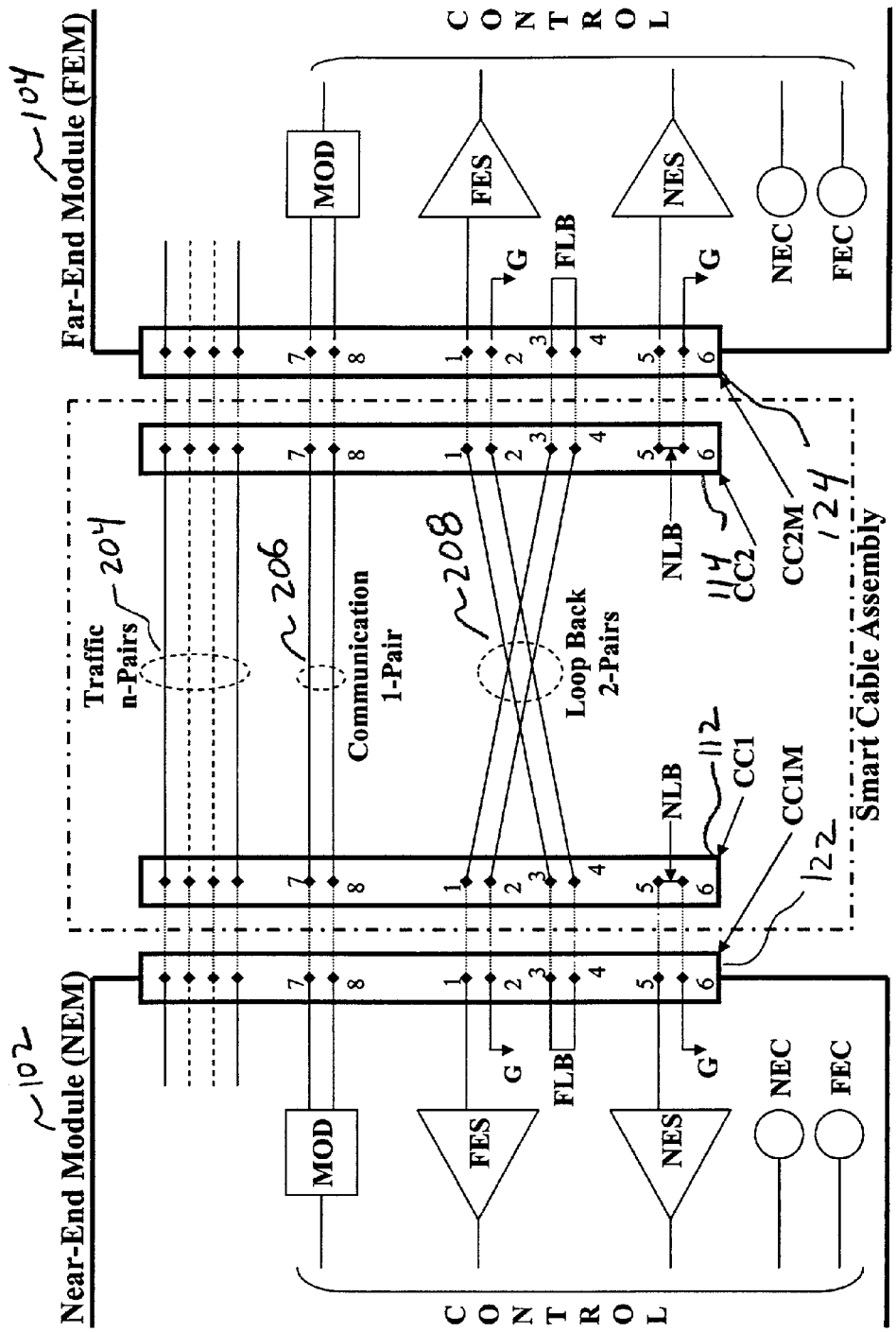
Figure 5  Smart Cable Assembly Structure

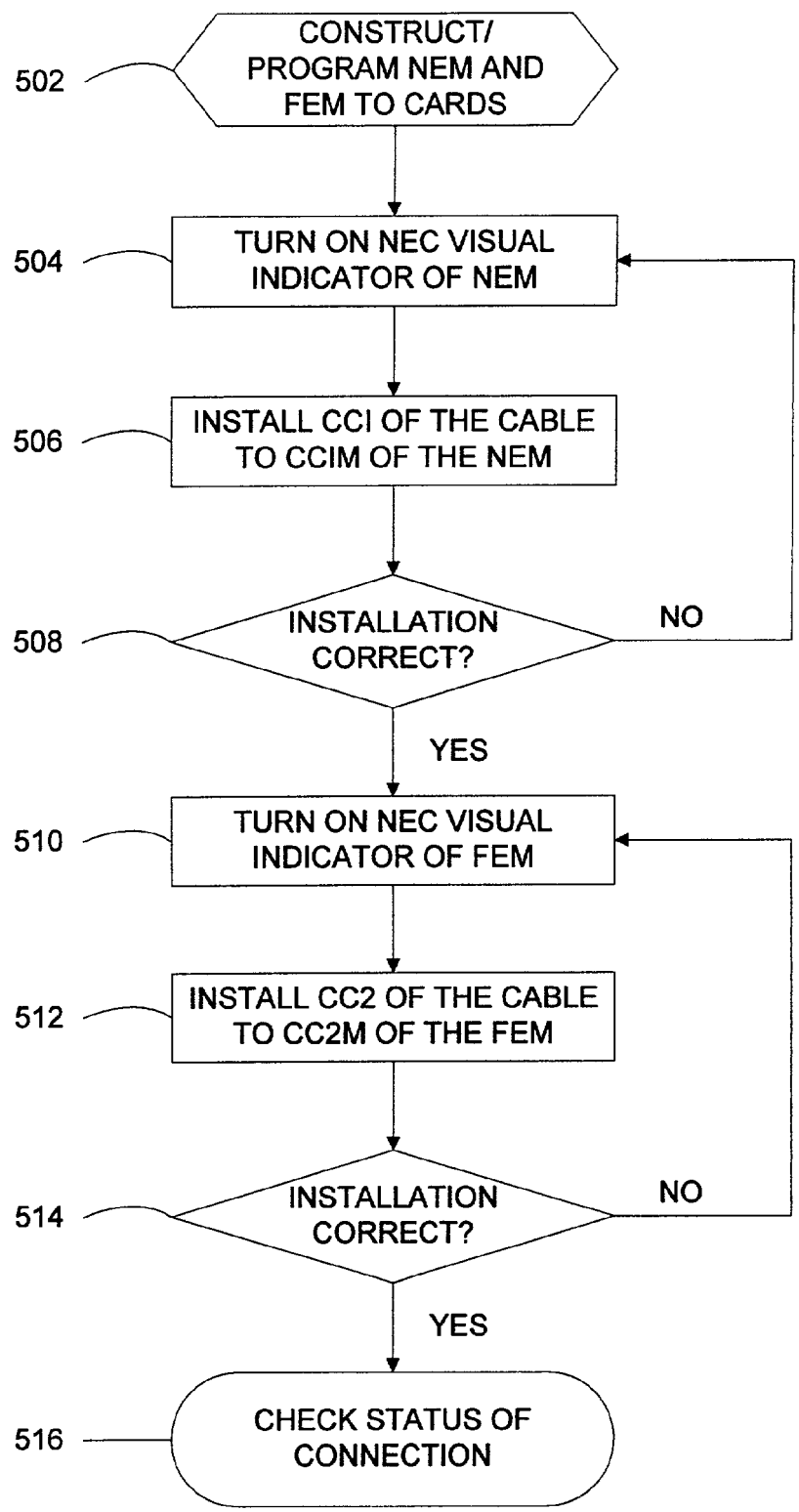
FIGURE 6 - INSTALLATION

SMART CABLE FOR DESIGN OF HIGH DENSITY METALLIC CROSS CONNECT SYSTEMS

CROSS REFERENCE TO RELATED APPLICATION

This application relates to and incorporates by reference U.S. patent application Ser. No. 10/126,281, filed Apr. 19, 2002, which application is commonly owned by the same assignee.

FIELD OF THE INVENTION

The present invention relates to cable systems. More particularly, this invention is directed to a "smart cable system" that can support the physical architecture of high density metallic cross connect switching systems. Specifically, the present invention discloses a smart cable system for interconnecting cards on shelves and racks to construct high density metallic cross connect switching systems.

BACKGROUND OF THE INVENTION

Legacy switching systems required an operator to manually connect calls between an ingress port and an egress port. In general terms, an "ingress port" refers to an input, and an "egress port" refers to an output. Since human interaction is often inefficient and subject to errors, the next generation switching systems were designed for use without the use of operators.

FIG. 1 illustrates a simplified block diagram of a conventional multi-stage cross connect switching system. The multi-stage cross connect switching system can be used to reduce the number of basic elements for a given n×m ports system. In this cross connect switching system, n and m each represents the number of ingress and egress ports, respectively. The n and m values can range from, for example, 10 to 100,000. The capacity of a cross connect system is generally referred to as n×m ports.

This system consists of an Ingress-Switching Stage 22, Core-Switching Stage(s) 24, an Egress-Switching Stage 26, the Inter-Stage Connections 32a, 32b, and the ingress 6 and egress ports 8 for connection to equipments outside the system. The ingress ports are designated as Ig1, Ig2, Igi, . . . Ign, and the egress ports are designated as Eg1, Eg2, Egi, . . . Egm. Each ingress 6 and egress 8 port consists of a pair of physical wire (i.e., 2 leads). The ingress ports 6 can also be connected to a Main Distribution Frame ("MDF") (not shown) in a central office. The egress ports 8, likewise, can be connected to another equipment, which may be another MDF.

This multi-stage switching system is used to reduce the number of cross points, but the disadvantage is that there may be a loss of system performance. Also illustrated are the connections within each switching stage. It can be appreciated that conventional interconnect switching systems can be quite complex, prone to errors during installations and maintenance, leading to potential reliability and system performance problems.

A fundamental design characteristic is the interconnection of the leads with each other. The interconnections can take place at different levels including: (1) device level—interconnecting basic elements to form a packaged device; (2) board level—interconnecting devices to form a circuit board; (3) shelf level—interconnecting boards to form a sub-system or system; (4) rack level—interconnecting shelves to form a sub-system or system; and (5) inter-rack level—interconnecting racks to form a sub-system or system. In the U.S. patent application Ser. No. 10/126,281, which contents are hereby incorporated by reference and commonly owned by the same assignee, the challenges associated with designing high density metallic cross connect switching systems were described in great detail.

FIG. 2 illustrates a rear view of a rack with shelves mounted therein. As illustrated, the rack 50 includes multiple shelves 52, 54, 56, which themselves include vertical cards 60 and horizontal cards 62. Each vertical 60 and horizontal 62 card includes a connector 64 for interconnecting to other cards or equipment. These components and their functionality are described in greater detail in the co-pending U.S. patent application Ser. No. 10/126,281.

FIG. 3 illustrates a rear view of the connections made inter-shelf and inter-rack for the high density metallic cross connect system. In greater detail, the inter-shelf connections 80 and inter-rack connections 82 can be implemented with the twisted cable pairs 92. Also, the twisted cable pairs 92 can be used for ingress connections 70 and egress connections 72. The inter-shelf connections 80 and inter-rack connections 82 can be implemented between two horizontal cards or between vertical and horizontal cards. The twisted cable pairs 92 have physical connectors attached at both ends of the cables. The cable length can vary and depends on the capacity of a particular system configuration.

As can be appreciated, an enormous amount of cables and space are needed to interconnect the various components of the high density metallic cross connect system. In addition, the following issues must be addressed during installation and maintenance: (1) space constraints can limit the accessibility and visibility of cables and the components, thereby resulting in errors during installation; (2) verification of properly connected cables is needed; (3) ability to add and/or removal cables and components; and (4) ability to detect faults. In particular, a cable installer must connect the cables without any errors. For example, the installer must connect one end of the cable to a particular connector within a particular slot within a particular shelf on the correct rack. Likewise, the installer must correctly connect the other end of the cable in the correct connector within a particular slot within a particular shelf on the correct rack. Obviously, this manual procedure is prone to many errors. Accordingly, the present invention is intended to provide a means for connecting the cables to cards while reducing such errors.

As detailed above, the conventional interconnect methods and techniques are inadequate and unworkable because of their physical interconnection tasks are enormous and extremely complex. One of the key challenges is to design and develop the physical interconnections for the overall system in an efficient and simplified manner. Accordingly, there is a need for a "smart cable system" to interconnect shelves and racks in an efficient and reliable manner to construct high density metallic cross connect switching systems.

SUMMARY OF THE INVENTION

In view of the above-described problems of the prior art, it is an object of the present invention to provide a "smart cable system" for high density metallic cross connect systems. The present invention is intended to overcome the problems associated with connecting cables in cross connect switching systems. In particular, this invention relates to the physical structure of cables and associated hardware needed to form the "smart cable system" for interconnecting cards on shelves and racks of high density metallic cross connect switching systems. This invention provides the cable installer the ability to connect cables to cards with minimal errors. Cable connections can be installed and verified using visual indicators. These visual indicators guide the cable installer such that he/she can properly install the cables into the appropriate connectors. The present invention also provides a means for detecting when and where the cables are connected within the cross connect system. This invention also detects changes in cable connections, which can be either the removal of existing cables or installation of new cables.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which:

FIG. 1 illustrates a simplified block diagram of a conventional multi-stage cross connect switching system;

FIG. 2 illustrates a rear view of a rack with shelves mounted therein;

FIG. 3 illustrates a rear view of the connections made inter-shelf and inter-rack for the high density metallic cross connect system;

FIG. 4 illustrates a smart cable system configuration in accordance with the present invention;

FIG. 5 illustrates a smart cable assembly structure in accordance with the present invention; and FIG. 6 illustrates a novel method for installing cables to construct the metallic cross connect system in accordance with the present invention.

DETAILED DESCRIPTION OF THE PREFERRED EMBODIMENTS

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 2–6, wherein like components are designated by like reference numerals throughout the various figures. Further, specific parameters such as system architecture, electronic components, modules, connectors, cables and the like are provided herein, and are intended to be explanatory rather than limiting. The present invention can be used with any communication system.

The present invention is directed to a "smart cable system" to physically interconnect components associated with high density metallic cross connect systems. Furthermore, the present invention relates to the physical structure of cables and associated hardware needed to form the "smart cable system" for interconnecting shelves and racks of high density metallic cross connect switching systems. In particular, the present invention addresses inter-connect levels associated with shelves-to-shelves and racks-to-racks.

Key attributes of the present invention include the ability to provide communication channels to enable end-to-end cable connectivity verification. Visual indicators are implemented to guide a cable installer such that he/she can properly install the cables into the appropriate connectors. The present invention also provides a means for detecting when and where the cables are connected within the cross connect system. Moreover, this invention also detects changes in cable connections, which can be either the removal of existing cables or installation of new cables. The system can also be used for fault diagnostic and repair.

FIG. 4 illustrates a smart cable system configuration in accordance with the present invention. FIG. 5 illustrates a smart cable assembly structure in accordance with the present invention. Reference will now be made concurrently to FIGS. 2–5 for a more comprehensive understanding of the present invention.

The following components are described in greater detail for a more complete understanding of the present invention. Each horizontal or vertical card 60, 62 includes a module such as a near-end module (NEM) 102 and a far-end module (FEM) 104. The NEM 102 and the FEM 104 are generally formed as printed circuit board assemblies residing on different shelves. The NEM 102 and FEM 104 are general reference points for any two cards. For one particular implementation of the present invention, the metallic cross connect system, the NEM 102 or FEM 104 can be a part of the horizontal or vertical card 60, 62. It is understood that one skilled in the art can designate any of the modules as near end or far end, depending on the relative position of the modules with each other.

The NEM 102 and the FEM 104 are identical and interchangeable components having similar components and functionalities and reside on different shelves or racks. The NEM 102 and FEM 104 are associated with connector assemblies CC1 112 and CC2 114, respectively. The NEM 102 and FEM 104 further include communication modules (MOD), which modules can be any type of communication modems. Each module (i.e., NEM 102 and FEM 104) includes a far-end sense detector (FES) for detecting the FEM and a near-end sense detector (NES) for detecting the NEM. Each module further includes a near-end connection visual indicator (NEC) that is controlled by a system processor to indicate to the cable installer activities status of the near-end location. A far-end connection visual indicator (FEC) is also included in each module and is similarly controlled by the system processor to indicate to the cable installer activities status of the far-end location. The NES is further coupled to a near-end loop back (NLB) through the ground G, and the FES is coupled to a far-end loop back (FLM) through the ground G.

A smart cable 202 includes twisted pairs for connecting the NEM 102 and FEM 104. Each cable 202 includes x number of twisted pairs. A majority of the twisted pairs are known as traffic pairs 204, which are used to send most of the data between the NEM 102 and FEM 104. The traffic pairs 204 are associated with the metallic paths that are cross-connected by the system. The cable 202 also includes at least one communication pair 206 and loop back pairs 208. The communication pair 206 is a dedicated pair for connecting the MODs in the NEM 102 and FEM 104. The MODs in the NEM 102 and the FEM 104 communicate with each other through the communication pair 206. The loop back pairs 208 are dedicated twisted pairs used to trigger far-end detectors.

FIG. 5 provides a more detailed view of the smart cable assembly structure of the present invention. The connectors CC1 112 and CC2 114 can be connected to corresponding mating parts CC1M 122 and CC2M 124. The CC1 112 and CC2 114 are attached to the end terminals of the smart cable 202, while the corresponding mating parts CC1M 122 and CC2M 124 are assembled with the printed circuit boards for NEM 102 and FEM 104, respectively.

It should be noted that there is a transposition of the two loop back pairs 208 when connecting the connectors CC 112 and CC2 114 to the mating parts CC1M 122 and CC2M 124. For example, pins 1 and 2 on CC1 112 are connected to pins 3 and 4 on CC2 114, while pins 1 and 2 on CC2 114 are connected to pins 3 and 4 of CC1 112. This transposition is necessary to enable the NEM 102 and FEM 104 to be identical. In this manner, either end terminals of the smart cable 202 are interchangeable, thereby allowing either end of the cable 202 to connect to mating parts CC1M 122 and CC2M 124 on the NEM 102 and FEM 104, respectively.

The NLB connections associated with CC1 112 and CC2 114 are also an integral part of the smart cable assembly and can be implemented with a connection on the corresponding connectors or any other appropriate device. The FLB connections associated with CC1M 122 and CC2M 124 are also integral to the NEM and FEM assembly and can be implemented with a connection on the corresponding connectors or other appropriate means. It should be noted the visual indicators NEC and FEC are mounted in locations that are readily visible to the installer/technician.

Although only two visual indicators are described herein, one skilled in the art can practice the present invention with one or more than two visual indicators. As an example, using one indicator, a steady light or signal for some predetermined duration can indicate proper cable connection to the NEM 102. Likewise, a flashing light or signal can indicate proper cable connection to both the NEM 102 and the FEM 104. One skilled in the art can design and operate the present invention using any number of visual indicators and types of signals, and as such, these designs and operations are contemplated to be within the scope and spirit of the present invention.

The NEM 102 and FEM 104 are mounted onto shelves and racks during the construction of high-density metallic cross connect systems. The number of shelves and racks required for a particular system is dictated by its capacity. Accordingly, the number of smart cables needed also depends on the capacity of the cross connect system.

Using the present invention, there are numerous advantages to ensure efficient installation and rapid deployment of the cross connect switching systems into operation. There are also numerous advantages associated with the on-going maintenance of the fully operational cross connect systems.

FIG. 6 illustrates a novel method for installing cables to construct the metallic cross connect system in accordance with the present invention. Typically, in new installations, the NEM 102 and FEM 104 are first constructed and programmed into horizontal or vertical cards in step 502. As noted above, these cards are themselves mounted on shelves, which are then mounted on racks.

Once the NEM 102 and FEM 104 are properly constructed/programmed at appropriate locations, the system (via software) sends a command through the control interface to turn on the NEC (i.e., visual indicator) associated with the NEM 102 in step 504. When the visual indicator is turned on for a particular NEM 102, the installer is directed to install one end (i.e., CC1 112) of the smart cable 202 into the near end mating CC1M 122 in step 506. The visual indicator could be a flashing light, light of certain duration, a particular color of light, or any other indicator that instructs and gets attention from the installer.

In step 508, the system confirms whether the installation has been successful. The NES detects a ground connection due to the NLB loop back connection. The system processor then receives the NES signal via the control interface, thereby providing confirmation that the cable 202 has been installed at the NEM 102. If unsuccessful, the process repeats itself from step 504.

Next, in step 510, the system (via software) sends another command through the control interface to turn on the NEC (i.e., visual indicator) associated with the FEM 104. When the visual indicator is turned on for a particular FEM 104, the installer is directed to install the other end (i.e., CC2 114) of the smart cable 202 into the far end mating CC1M 124 in step 512. The system confirms again whether the installation has been successful in step 514. The NES on the FEM 104 detects a ground connection through the NLB on the CC2 114. The system processor then receives the NES via the control interface, thereby providing confirmation that the cable 202 has been installed at the FEM connector CC2M 124.

Concurrently with the preceding steps, the FES in both the NEM 102 and FEM 104 detect loop back signals due to the FLB connections on both of the NEM 102 and FEM 104. The system processor receives the respective FES signals, thereby confirming that both ends of the smart cable 202 are connected to the correct modules. The system processor can then transmit another command (via software) to turn on the FEC visual indicators on both the NEM 102 and FEM 104, providing visual confirmation to the installer that the cable is connected at both ends.

In step 516, the next step is to verify that the connected NEM 102 and FEM 104 are of the correct location, type or vintage. The verification can be performed by exchanging location information, signature or personality data associated with each NEM 102 and FEM 104 through the communication pair 206 connected to the MODs. If the exchanged data are incorrect, the system processor sends an alerting signal to the installer, such as a "flashing" FEC light or any other signal. These steps can be repeated for each cable installation in the system.

After the cross connect system is installed and in operation, there may be a need to reconfigure the system due to variety of reasons, such as capacity expansion or change in service configuration. These system changes will most likely require the addition or deletion of cables or changing cable connections. In this situation, human errors are most likely to occur due to space congestion that tends to impair access to the connectors and lack of visual identification the correct connectors. Furthermore, removing the wrong cable can adversely impact existing services in a severe manner. The smart cable system of the present invention can reduce such errors and adverse effects by turning on the NEC visual indicator to guide the installer/technician to remove the correct cable and to install the cable to the right connector, on step-by-step basis.

In a fully operational system, the system processor of the present invention can maintain a record of all cable connections for the entire cross-connect system. The record contains data of NEM and FEM with or without cables connected. In many cases, changes in connection can often occur either intentionally or unintentionally. The present system can scan the status of all NES and FES signals on each NEM and FEM in a periodic manner and compare them with previously stored cable connection status to locate any changes. If a change has occurred, system processor will take the appropriate action to validate such change.

In the previous descriptions, numerous specific details are set forth such as system architecture, electronic components, cards, connectors, modules, etc. to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A cable assembly for connecting cards in a metallic cross connect switching system, the assembly comprising:
    a first card having a near end module including a near end mating part;
    a second card having a far end module including a far end mating part, wherein the near end module and the far end module each includes a communication device, a far end detector, a near end detector, and visual indicators, wherein the far end detector detects the presence of the far end module and the near end detector detects the presence of the near end module;
    a near-end loop back coupled to the near end detector;
    a far-end loop back coupled to the far end detector; and
    a cable further comprising:
        a connector at each end of the cable for connecting to the near end mating part and the far end mating part;
        a communication pair for coupling the communication devices;
        loop back pairs for triggering the far end detectors; and
        traffic pairs for transmitting data between the near end module and the far end module.

2. The assembly of claim 1, wherein the modules comprise of printed circuit board assemblies.

3. The assembly of claim 1, wherein the visual indicators comprise a near end visual indicator and a far end visual indicator.

4. The assembly of claim 3, wherein the near end visual indicator indicates activities associated with the near end module.

5. The assembly of claim 4, wherein the far end visual indicator indicates activities associated with the far end module.

6. The assembly of claim 1, wherein the far end detector is coupled to said far end loop back when the connectors at each end of the cable are connected to the near end mating part and the far end mating part, respectively.

7. The assembly of claim 1, wherein the near end detector is coupled to said near end loop back when the connectors at each end of the cable are connected to the near end mating part and the far end mating part, respectively.

8. A system for interconnecting a first card located on a first shelf to a second card located on a second shelf in a metallic cross connect system, the system comprising:
    the first card having a near end module and a near end mating part;
    the second card having a far end module and a far end mating part;
    the near end module and the far end module each including a communication device, a far end detector, a near end detector, and visual indicators, wherein the far end detector detects the presence of the far end module and the near end detector detects the presence of the near end module;
    a near-end loop back coupled to the near end detector;
    a far-end loop back coupled to the far end detector; and
    a cable further comprising:
        a connector at each end of the cable for connecting to the near end mating part and the far end mating part;
        a communication pair for coupling the communication devices;
        loop back pain for triggering the far end detectors; and
        traffic pairs for transmitting data between the near end module and the far end module.

9. The assembly of claim 8, wherein the modules comprise of printed circuit board assemblies.

10. The assembly of claim 8, wherein the visual indicators comprise a near end visual indicator and a far end visual indicator.

11. The assembly of claim 10, wherein the near end visual indicator indicates activities associated with the near end module.

12. The assembly of claim 11, wherein the far end visual indicator indicates activities associated with the far end module.

13. The assembly of claim 8, wherein the far end detector is coupled to said far end loop back when the connectors at each end of the cable are connected to the near end mating part and the far end mating part, respectively.

14. The assembly of claim 8, wherein the near end detector is coupled to said near end loop back when the connectors at each end of the cable are connected to the near end mating part and the far end mating part, respectively.

15. A method for installing a cable from a first card on a first shelf to a second card on a second shelf in a metallic cross connect system, comprising:
    providing a near end module to the first card and a far end module to the second card, wherein the near end module and the far end module are identical and each includes a mating part, a communication device, a far end detector, a near end detector, and visual indicators, wherein the far end detector detects the presence of the far end module and the near end detector detects the presence of the near end module;
    coupling a near-end loop back to the near end detector;
    coupling a far-end loop back to the far end detector;
    activating the near end visual indicator of the near end module;
    connecting a first connector of a cable to the near end mating part of the near end module; and
    activating the far end visual indicator of the far end module; and
    connecting a second connector of the cable to the far end mating part of the far end module.

16. The method according to claim 15, further comprising verifying the connection between the near end module and the far end module by exchanging location information and personality data through a communication pair of the cable.

17. The method according to claim 15, wherein the steps of activating the near end visual indicator and the far end visual indicator comprises transmitting a command signal tough a control interface.

* * * * *